United States Patent [19]
Bellue, Jr.

[11] Patent Number: 6,145,432
[45] Date of Patent: Nov. 14, 2000

[54] COOKING POT

[76] Inventor: Wirt E. Bellue, Jr., 3110 Scenic Hwy., Baton Rouge, La. 70805

[21] Appl. No.: 09/450,332

[22] Filed: Nov. 29, 1999

[51] Int. Cl.[7] ............................. A23L 1/00; A23L 1/31; A23L 3/34; A23G 1/00; A23G 1/10

[52] U.S. Cl. ............................. 99/348; 99/472; 99/516; 99/535; 366/139; 366/144; 366/149; 366/233

[58] Field of Search ........................... 99/348, 485, 486, 99/472–474, 479, 487, 452–455, 494, 535, 516, 517, 470; 366/110, 139, 141, 144–149, 185, 219, 233, 235, 75, 85, 151.1, 152.2, 155.1, 156.1, 291, 158.4, 297–301, 309, 196, 601; 426/231, 519, 660, 641, 524, 266; 62/342

[56] References Cited

U.S. PATENT DOCUMENTS

| | | |
|---|---|---|
| 1,430,012 | 9/1922 | Heiser . |
| 2,557,622 | 6/1951 | Trier ........................................ 259/122 |
| 3,943,837 | 3/1976 | Trkla ........................................ 99/339 |
| 4,038,426 | 7/1977 | Jespersen et al. ..................... 99/535 X |
| 4,173,925 | 11/1979 | Leon ......................................... 99/348 |
| 4,179,904 | 12/1979 | McClenny ................................. 62/342 |
| 4,214,518 | 7/1980 | Petsche ................................. 99/535 X |
| 4,409,704 | 10/1983 | Seiffhart ................................. 452/141 |
| 4,432,650 | 2/1984 | Langen et al. .......................... 366/147 |
| 4,446,779 | 5/1984 | Hubbard et al. .......................... 99/472 |
| 4,498,378 | 2/1985 | Norrie et al. ......................... 99/348 X |
| 4,517,888 | 5/1985 | Gould ....................................... 99/472 |
| 4,520,718 | 6/1985 | Prosenbauer ............................. 99/535 |
| 4,522,118 | 6/1985 | Simonsen et al. ........................ 99/472 |
| 4,572,662 | 2/1986 | Widdowson ............................. 99/345 |
| 4,791,705 | 12/1988 | Corominas ............................. 452/141 |
| 4,823,684 | 4/1989 | Traeger et al. .......................... 99/447 |
| 4,958,410 | 9/1990 | Lagares ................................. 99/472 X |
| 5,104,232 | 4/1992 | Lennox, III .......................... 366/139 X |
| 5,323,694 | 6/1994 | Higashimoto ........................ 99/487 X |
| 5,613,774 | 3/1997 | Chandra et al. ........................ 366/228 |

*Primary Examiner*—Timothy F Simone
*Attorney, Agent, or Firm*—Reginald F. Roberts, Jr.

[57] ABSTRACT

A cooking pot for the preparation and dispensing of food. The pot can be operated at atmospheric pressure, at higher pressures as a pressure-cooker, or under vacuum as a vacuum tumbler. The pot is rotatable about both its longitudinal axis and its lateral axis. A dispenser connected to one end of the pot enables the food preparer to dispense a definite and desired amount of the prepared food.

13 Claims, 4 Drawing Sheets

COOKING POT

BACKGROUND OF THE INVENTION

The present invention relates to food preparation. More particularly, the invention relates to a vessel for cooking food.

Various prior-art patent describe vessels used for food preparation. In particular, U.S. Pat. No. 4,173,925 to Leon discloses a variable-tilt rotating pot cooker and mixer. None of these prior-art patents, however, discloses any mechanisms for (a) preparing food under pressure or vacuum, or (b) dispensing a specific and predetermined amount of the prepared food. The present invention provides mechanisms for both of these operations.

SUMMARY OF THE INVENTION

In general, the present invention provides a cooking pot. In a first aspect, the cooking pot comprises (a) an enclosed first hollow member having an internal volume, first and second ends, a beveled neck at its first end, a longitudinal axis, and a lateral axis substantially perpendicular to the longitudinal axis; (b) a first opening in the beveled neck at the first end of the first hollow member; (c) a support frame on which the first hollow member is mounted; (d) a second hollow member having an internal volume and first and second ends, the internal volume of the second hollow member being substantially less than the internal volume of the first hollow member; (e) a second opening at the first end of the second hollow member; (f) a third opening at the second end of the second hollow member; (g) means for heating the first hollow member; (h) means for rotating the first hollow member about its longitudinal axis; (i) means for rotating the first hollow member about its lateral axis; (j) means for connecting the first end of the second hollow member to the first end of the first hollow member; and (k) a stopper for closing the third opening at the second end of the second hollow member.

In a second aspect, the cooking pot comprises (a) an enclosed first hollow member having an internal volume, first and second ends, a beveled neck at its first end, a longitudinal axis, and a lateral axis substantially perpendicular to the longitudinal axis; (b) a first opening in the beveled neck at the first end of the first hollow member; (c) a second hollow member having an internal volume and first and second ends, the internal volume of the second hollow member being substantially less than the internal volume of the first hollow member; (d) a second opening at the first end of the second hollow member; (e) a third opening at the second end of the second hollow member; (f) means for heating the first hollow member; (g) means for cooling the first hollow member; (h) a third hollow member, in which the first hollow member is supportedly and rotatably disposed; (i) a support frame on which the second hollow member is mounted; (j) a first axle substantially colinear with the longitudinal axis of the first hollow member, connected to the second end of the first hollow member; (k) an electric motor connected to the first axle, for rotating the first hollow member about its longitudinal axis; (l) a second axle substantially colinear with the lateral axis of the first hollow member, fastened to the the third hollow member; (m) a handle fastened to the second axle, for rotating the first hollow member about its lateral axis; (n) a head including an L-shaped hollow adapter having first and second open ends, the first end of the adapter opening into the first opening at the first end of the first hollow member, the second end of the adapter being constructed and arranged to be connected to the first end of the second hollow member, thereby connecting the first end of the second hollow member to the first end of the first hollow member; (o) a stopper for closing the third opening at the second end of the second hollow member; and (p) means for inducing a vacuum within the first hollow member.

The cooking pot is constructed and arranged so that food to be cooked is depositable in the first hollow member, the food is cookable by heating the first hollow member while mixing the food by rotating the first hollow member about its longitudinal axis, and a predetermined and specific volume of the cooked food is depositable in the second hollow member by closing the third opening at the second end of the second hollow member with the stopper, connecting the first end of the second hollow member to the first end of the first hollow member, and rotating the first hollow member about its lateral axis into a configuration in which the second hollow member is below the first hollow member.

In a third aspect, the cooking pot comprises (a) an enclosed hollow member having first and second ends, a beveled neck at its first end, a longitudinal axis, and a lateral axis substantially perpendicular to the longitudinal axis, for containing and cooking food; (b) an opening in the beveled neck at the first end of the hollow member, for depositing uncooked food and dispensing cooked food; (c) a support frame on which the hollow member is mounted; (d) means for heating the hollow member, to cook food deposited therein; (e) means for rotating the hollow member about its longitudinal axis, in order to mix the food being cooked; (f) means for rotating the hollow member about its lateral axis, for dispensing the cooked food; and (g) a head for closing and sealing the opening at the first end of the hollow member against both positive and negative pressures, whereby the cooking pot can be operated at atmospheric, superatmospheric, and subatmospheric pressures.

In a fourth aspect, the cooking pot comprises (a) an enclosed hollow member having first and second ends, a beveled neck at its first end, a longitudinal axis, and a lateral axis substantially perpendicular to the longitudinal axis, for containing and cooking food; (b) an opening in the beveled neck at the first end of the hollow member, for depositing uncooked food and dispensing cooked food; (c) means for supporting the hollow member; (d) means for heating the hollow member, to cook the food deposited therein; (e) means for rotating the hollow member about its longitudinal axis, to mix the food being cooked; and (f) means for rotating the hollow member about its lateral axis, to dispense the cooked food.

In a fifth aspect the cooking pot comprises (a) an enclosed hollow member having first and second ends, a longitudinal axis, and a lateral axis substantially perpendicular to the longitudinal axis, for containing and preparing food; (b) an opening in the first end of the hollow member, for depositing food to be prepared and dispensing prepared food; (c) means for supporting the hollow member; (d) means for heating the hollow member, to cook the food deposited therein; (e) means for rotating the hollow member about its longitudinal axis, to mix the food being prepared; and (f) means for sealing the opening in the first end of the hollow member against positive and negative pressures, whereby the cooking pot can be operated at atmospheric, superatmospheric, and subatmospheric pressures.

DETAILED DESCRIPTION OF THE INVENTION

More specifically, reference is made to FIGS. 1–4, in which is shown a cooking pot, made in accordance with the principles of the present invention, and generally designated by the numeral 2.

Figure 1:
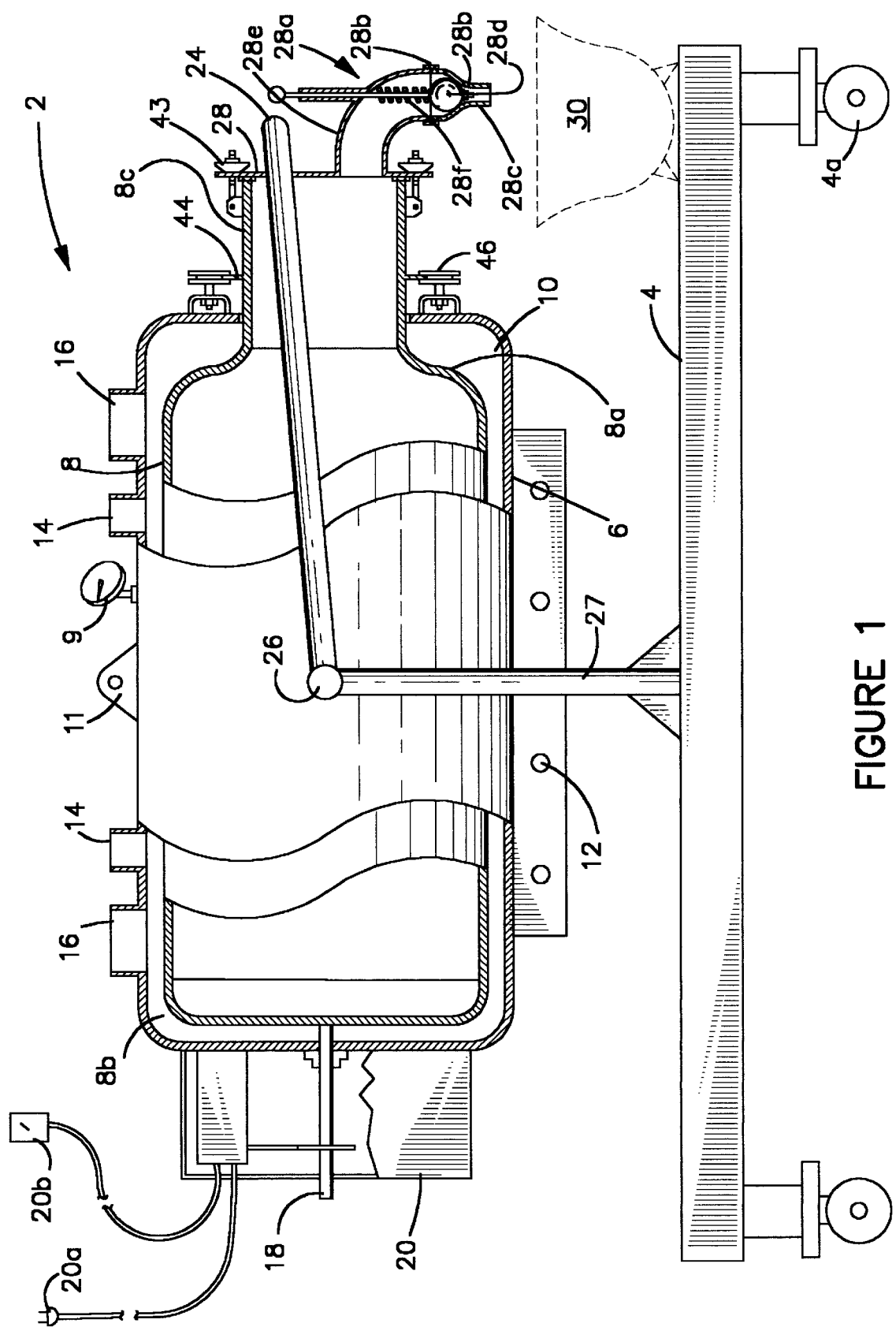
FIG. 1 is a side view, partly schematic, of a cooking pot made in accordance with the principles of the present invention, with a portion of the cooking pot cut away to reveal the internal structure and arrangement of the cooking pot.
Figure 2:
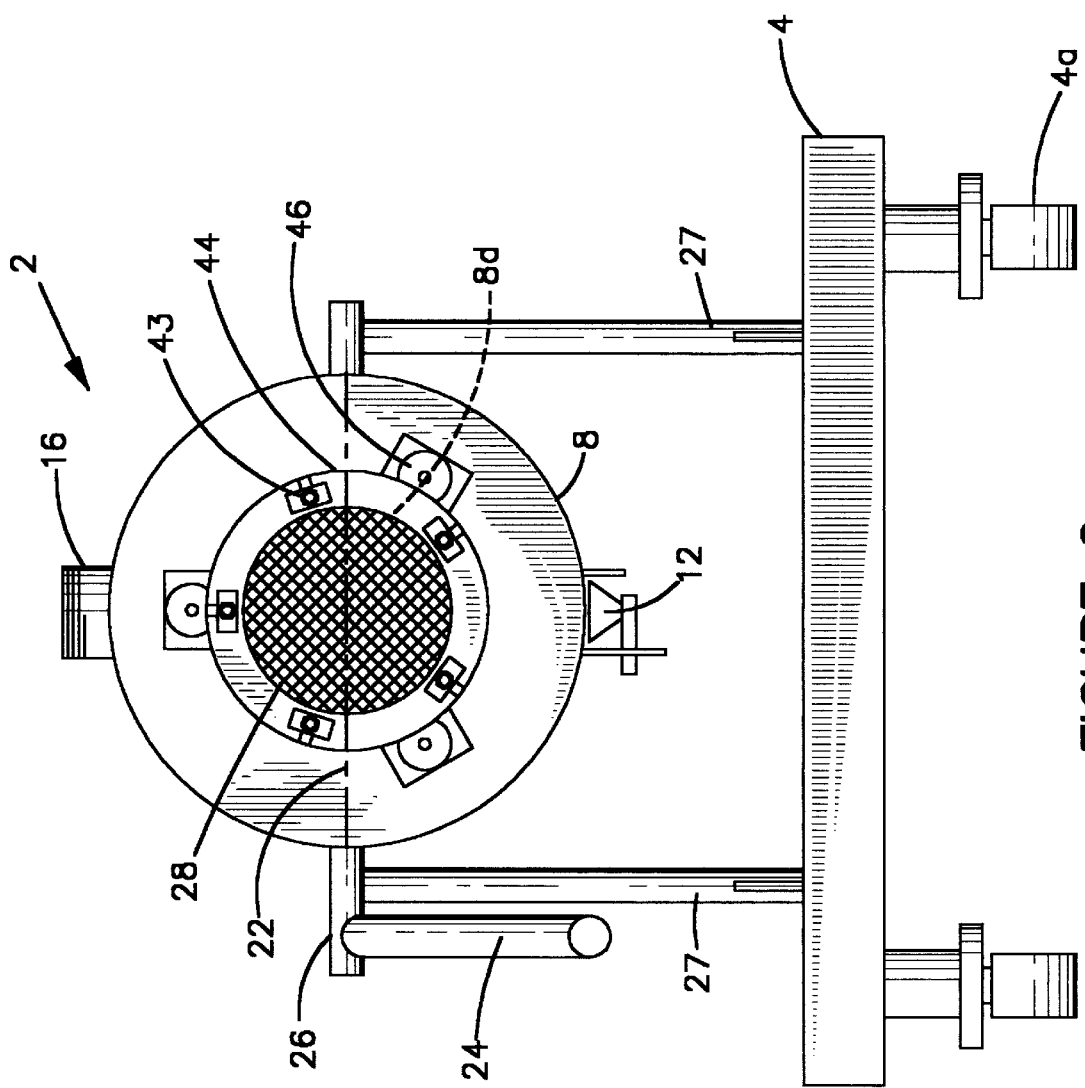
FIG. 2 is a front view, partly schematic, of a portion of the cooking pot, showing a strainer head.

A movable platform 4 resting on a plurality of rollers 4a and having an open middle portion supports an outer cylindrical thermal jacket 6 in which is supportedly and rotatably disposed an internal cylindrical container 8 where food is cooked. The container 8 has first and second ends 8a and 8b. The first end 8a of the container 8 tapers to a beveled neck 8c (FIGS. 1 and 4) which includes an opening 8d (FIG. 2). The neck 8c is beveled to prevent accumulation of food in the space below the neck 8c when food is dispensed. As used herein, the term "beveled neck" is defined to mean that the neck 8c is of smaller diameter than the rest of the container 8, and that the neck 8c is slopingly connected to the rest of the container 8.

Preferably, the thermal jacket 6 and the container 8 are coaxial. The thermal jacket 6 and the container 8 define therebetween an annular space 10 which is used to heat or cool the contents of the container 8. Heating is by means of a plurality of gas burners 12. Cooling is effected by circulating a liquid in the annular space 10 between the thermal jacket 6 and the container 8. Heat is released and coolant added through ports 14 and 16. An opening (not shown) below the container 8 serves as an outlet for the coolant, which is preferably water. A temperature gauge 9 measures the temperature.

Figure 4:
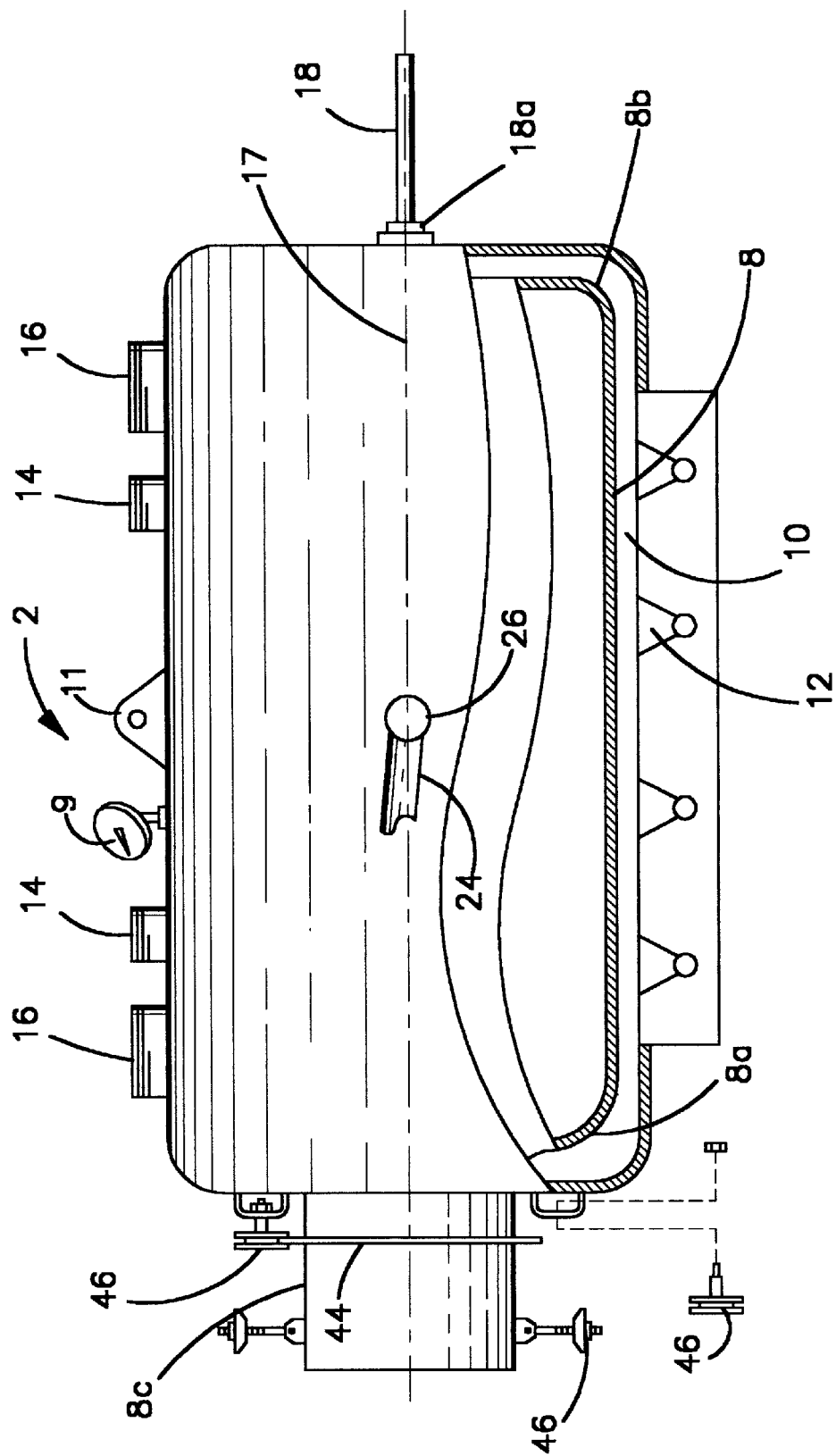
FIG. 4 is a side view, partly schematic, of a portion of the cooking pot, showing a flanged bearing in which an axle is disposed.

Rotation of the container 8 about its longitudinal axis 17 (FIGS. 1 and 4) in either clockwise or counterclockwise direction is effected by rotation of a first axle 18 connected to a reversible, variable-speed electric motor 20. The motor 20 is provided with an electrical inlet plug 20a and a selector switch 20b. The plug 20a preferably includes a third prong for grounding. Rotation of the container 8 about its lateral axis 22 (FIG. 2) is accomplished through a tilt handle 24 connected to one of a pair of second axles 26. The thermal jacket 6 is mounted on the platform 4 by a pair of support legs 27 fastened to the platform 4, in which the axles 26 are journalled (FIGS. 1 and 2). The container 8 is supported by the jacket 6. The first end 8a of the container 8 is supported by a ring 44 fastened to the neck 8c of the container 8 and rotatably disposed in bearings 46 fastened to the thermal jacket 6 (FIGS. 1 and 4). The second end 8b of the container 8 is supported by the first axle 18, which is disposed in a flanged bearing 18a (FIG. 4). Because the center of the platform 4 is hollow, the thermal jacket 6 and the container 8 can be rotated in a vertical plane through a circular path of 360°. A lifting eye 11 (FIGS. 1 and 4) is connectable to a crane (not shown).

The cooking pot 2 is fitted with a changeable head 28 for cooking food at atmospheric pressure or at higher pressures; for using the pot as a vacuum tumbler for mixing; and for dispensing a specific and predetermined quantity of the cooked food.

The head 28 shown in FIG. 1 includes an L-shaped adapter 28a threadably connected to a dispenser 28b, for dispensing a specific volume of cooked food into a receptacle 30. This is accomplished by first tilting the container 8 and the thermal jacket 6 clockwise (as viewed in FIG. 1) downward, thereby filling the adapter 28a and the dispenser 28b, which is closed at its free end 28c by a ball plug 28d. The plug 28d is preferably made of rubber, and a flexible spring-loaded handle 28f is preferably attached to the plug 28d, for easy insertion and withdrawal of the plug 28d. The container 8 and thermal jacket 6 are then tilted counter-clockwise upward, so that the food product drains from the horizontal portion 28e of the adapter 28a. The plug 28d is then removed from the free end 28c of the dispenser 28b, causing the desired amount of the cooked food to be discharged from the dispenser 28b into the receptacle 30. It is beneficial to tilt the container 8 several times upward and downward before dispensing the food, in order to ensure that the food is thoroughly mixed. There are a plurality of dispensers 28b of different sizes and volumes, so that a plurality of different quantities of food can be dispensed as desired.

The head 28 shown in FIG. 2 is used to separate solid and liquid food ingredients; for example, to drain off grease from cooked fish or meat.

Figure 3:
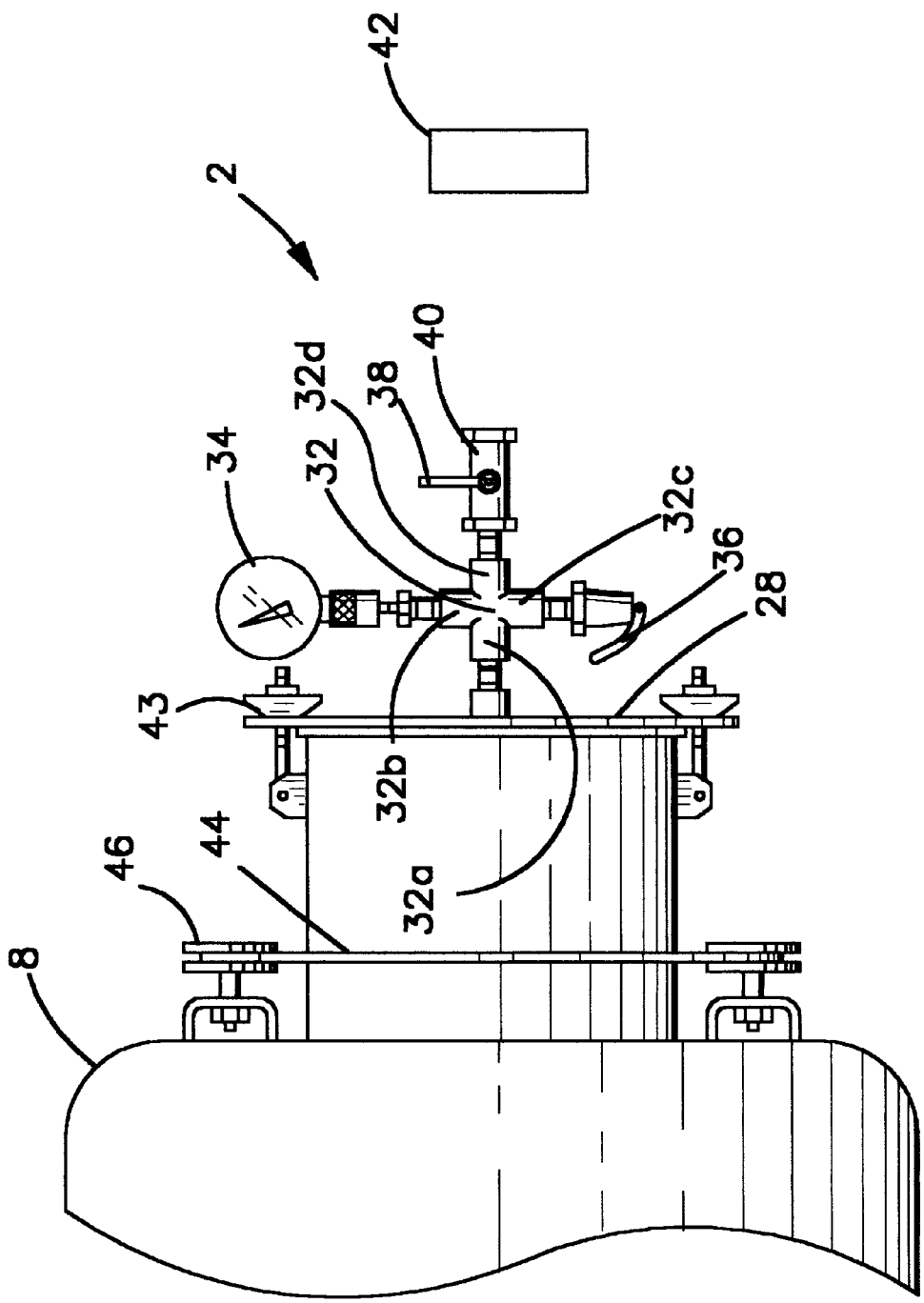
FIG. 3 is a front view, partly schematic, of a portion of the cooking pot, showing a head for operating the cooking pot under a positive pressure or a partial vacuum.

The head 28 shown in FIG. 3 is used for preparing food under pressure or vacuum. A four-way connector 32 is equipped with a pressure or vacuum gauge 34. A first branch 32a of the connector 32 connects the connector 32 to the head 28, which has an open central passageway 28e (FIG. 1) into the interior of the container 8. A second branch 32b is connected to the pressure or vacuum gauge 34. A third branch 32c is connected to a safety pressure-release device 36. A fourth branch 32d is provided with a valve 38. The fourth branch 32d is further provided with a tubular connecting member 40, for connecting the head 28 to a vacuum pump 42. When the cooking pot 2 is being used as a pressure-cooker, the valve 40 is closed to build up and maintain internal pressure, and opened to relieve the pressure and equilibrate the container 8 with atmospheric pressure. When the cooking pot 2 is being used as a vacuum mixer, the connecting member 40 is connected to the vacuum pump 42, the valve 38 is opened, and the pump 42 is turned on and runs until the desired vacuum is induced in the container 8. The valve 38 is then closed, the vacuum pump 42 is turned off, and the connecting member 40 is disconnected from the head 28. The contents of the container 8 are then mixed under vacuum by rotating the first axle 18. This mode of operation is especially effective and efficient for seasoning fish, seafood, or meat. The seasoning is drawn into the fish, seafood, or meat and permeates it thoroughly.

The head 28 is secured to the neck 8c of the container 8 by clamps 43 fastened to the neck 8c. A gasket (not shown) attached to the head 28 is disposed between the head 28 and the neck 8c of the container 8. A ring 44, fastened to the neck 8c, revolves in bearings 46 fastened to the jacket 6. (FIGS. 1–4.)

Preferably, the container 8 has an inner diameter of about twenty-four inches, a length of about sixty-one inches up to the neck 8c, a total length of about sixty-nine inches, and an internal volume of about one-hundred gallons. The interchangeable heads 28 have a diameter of preferably about twelve inches. The ring 44 has an outside diameter of preferably from about fifteen to about sixteen inches, and a rim of preferably about one-half inch. The thermal jacket 6 has a length of preferably about sixty-six inches. The container 8, heads 28, ring 44, and bearings 46 are preferably made of stainless steel. The container 8 and heads 28 are beneficially fabricated from stainless-steel pipe. The first axle 18 and the bearing 18a have a diameter of preferably about one and one-half inches.

For best results, the container 8 should be tilted several times while the food is being prepared. Tilting may be effected by either manual, mechanical, or electrical operation of the handle 24. The tilting may be automatic or semiautomatic, and it may be electronically programmed.

While certain embodiments and details have been used to illustrate the present invention, it will be apparent to those skilled in the art that many modifications thereof can be made within the scope of the claimed invention. For example, if no specific quantity of prepared food is required, the food can be dispensed without tilting the container upward before dispensing the food through the dispenser 28b, or by simply removing the head 28 and recovering the food from the neck 8c.

I claim:

1. A cooking pot, comprising:
   (a) an enclosed first hollow member having an internal volume, first and second ends, a beveled neck at its first end, a longitudinal axis, and a lateral axis substantially perpendicular to the longitudinal axis;
   (b) a first opening in the beveled neck at the first end of the first hollow member;
   (c) a support frame on which the first hollow member is mounted;
   (d) a second hollow member having an internal volume and first and second ends, the internal volume of the second hollow member being substantially less than the internal volume of the first hollow member;
   (e) a second opening at the first end of the second hollow member;
   (f) a third opening at the second end of the second hollow member;
   (g) means for heating the first hollow member;
   (h) means for rotating the first hollow member about its longitudinal axis;
   (i) means for rotating the first hollow member about its lateral axis;
   (j) means for connecting the first end of the second hollow member to the first end of the first hollow member; and
   (k) a stopper for closing the third opening at the second end of the second hollow member;
the cooking pot being constructed and arranged so that food to be cooked is depositable in the first hollow member, the food is cookable by heating the first hollow member while mixing the food by rotating the first hollow member about its longitudinal axis, and a predetermined and specific volume of the cooked food is depositable in the second hollow member by closing the third opening at the second end of the second hollow member with the stopper, connecting the first end of the second hollow member to the first end of the first hollow 40 member about its lateral axis into a configuration in which the second hollow member is below the first hollow member.

2. The cooking pot of claim 1, wherein the means for connecting the first end of the second hollow member to the first end of the first hollow member include:
   (l) a head including an L-shaped hollow adapter having first and second open ends, the first end of the adapter opening into the first opening in the beveled neck at the first end of the first hollow member, the second end of the adapter being constructed and arranged to be connected to the first end of the second hollow member, thereby connecting the second hollow member to the first end of the first hollow member.

3. The cooking pot of claim 1, wherein the means for rotating the first hollow member about its longitudinal axis include:
   (l) an axle substantially colinear with the longitudinal axis of the first hollow member, connected to the second end of the first hollow member; and
   (m) an electric motor connected to the axle.

4. The cooking pot of claim 1, wherein the means for rotating the first hollow member about its lateral axis include:
   (l) a third hollow member, disposed around the first hollow member;
   (m) an axle substantially colinear with the lateral axis of the first hollow member, fastened to the third hollow member; and
   (n) a handle fastened to the axle.

5. The cooking pot of claim 1, wherein the means for rotating the first hollow member about its longitudinal axis include:
   (l) a first axle substantially colinear with the longitudinal axis of the first hollow member, connected to the second end of the first hollow member; and
   (m) an electric motor connected to the first axle;
and wherein the means for rotating the first hollow member about its lateral axis include:
   (n) a third hollow member, mounted on the support frame and disposed around the first hollow member;
   (o) a second axle substantially colinear with the lateral axis of the first hollow member, fastened to the third hollow member; and
   (p) a handle fastened to the second axle.

6. The cooking pot of claim 1, further comprising:
   (l) means for inducing a vacuum within the first hollow member.

7. A cooking pot, comprising:
   (a) an enclosed first hollow member having an internal volume, first and second ends, a beveled neck at its first end, a longitudinal axis, and a lateral axis substantially perpendicular to the longitudinal axis;
   (b) a first opening in the beveled neck at the first end of the first hollow member;
   (c) a second hollow member having an internal volume and first and second ends, the internal volume of the second hollow member being substantially less than the internal volume of the first hollow member;
   (d) a second opening at the first end of the second hollow member;
   (e) a third opening at the second end of the second hollow member;
   (f) means for heating the first hollow member;
   (g) means for cooling the first hollow member;
   (h) a third hollow member, in which the first hollow member is supportedly and rotatably disposed;
   (i) a support frame on which the third hollow member is mounted;
   (j) a first axle substantially colinear with the longitudinal axis of the first hollow member, connected to the second end of the first hollow member;

(k) an electric motor connected to the first axle, for rotating the first hollow member about its longitudinal axis;

(l) a second axle substantially colinear with the lateral axis of the first hollow member, fastened to the third hollow member;

(m) a handle fastened to the second axle, for rotating the first hollow member about its lateral axis;

(n) a head including an L-shaped hollow adapter having first and second open ends, the first end of the adapter opening into the first opening at the first end of the first hollow member, the second end of the adapter being constructed and arranged to be connected to the first end of the second hollow member, thereby connecting the first end of the second hollow member to the first end of the first hollow member;

(o) a stopper for closing the third opening at the second end of the second hollow member; and (p) means for inducing a vacuum within the first hollow member;

the cooking pot being constructed and arranged so that food to be cooked is depositable in the first hollow member, the food is cookable by heating the first hollow member while mixing the food by rotating the first hollow member about its longitudinal axis, and a predetermined and specific volume of the cooked food is depositable in the second hollow member by closing the third opening at the second end of the second hollow member with the stopper, connecting the first end of the second hollow member to the first end of the first hollow member, and rotating the first hollow member about its lateral axis into a configuration in which the second hollow member is below the first hollow member.

8. The cooking pot of claim 6, wherein the means for inducing a vacuum within the first hollow member include:

(m) a head including a passageway opening into the first opening in the beveled neck at the first end of the first hollow member;

(n) a vacuum pump;

(o) a fourth hollow member having open first and second ends, for connecting the vacuum pump to the passageway in the head; and (p) a valve connected to the passageway, for closing the passageway after the vacuum has been induced in the first hollow member.

9. The cooking pot of claim 7, wherein the means for inducing a vacuum within the first hollow member include:

(r) a head including a passageway opening into the first opening at the first end of the first hollow member;

(s) a vacuum pump;

(t) a fourth hollow member having open first and second ends, for connecting the vacuum pump to the passageway in the head; and (u) a valve connected to the passageway, for closing the passageway after the vacuum has been induced in the first hollow member.

10. A cooking pot, comprising:

(a) an enclosed hollow member having first and second ends, a beveled neck at its first end, a longitudinal axis, and a lateral axis substantially perpendicular to the longitudinal axis, for containing and cooking food;

(b) an opening in the beveled neck at the first end of the hollow member, for depositing uncooked food and dispensing cooked food;

(c) a support frame on which the hollow member is mounted;

(d) means for heating the hollow member, to cook the food deposited therein;

(e) means for rotating the hollow member about its longitudinal axis, to mix the food being cooked;

(f) means for rotating the hollow member about its lateral axis, to dispense the cooked food; and (g) a head for closing and sealing the opening in the beveled neck at the first end of the hollow member against both positive and negative pressures, whereby the cooking pot can be operated at atmospheric, superatmospheric, and subatmospheric pressures.

11. A cooking pot, comprising:

(a) an enclosed hollow member having first and second ends, a beveled neck at its first end, a longitudinal axis, and a lateral axis substantially perpendicular to the longitudinal axis, for containing and cooking food;

(b) an opening in the beveled neck at the first end of the hollow member, for depositing uncooked food and dispensing cooked food;

(c) means for supporting the hollow member;

(d) means for heating the hollow member, to cook the food deposited therein;

(e) means for rotating the hollow member about its longitudinal axis, to mix the food being cooked; and (f) means for rotating the hollow member about its lateral axis, to dispense the cooked food.

12. A cooking pot, comprising:

(a) an enclosed hollow member having first and second ends, a longitudinal axis, and a lateral axis substantially perpendicular to the longitudinal axis, for containing and preparing food;

(b) an opening in the first end of the hollow member, for depositing food to be prepared and dispensing prepared food;

(c) means for supporting the hollow member;

(d) means for heating the hollow member, to cook the food deposited therein;

(e) means for rotating the hollow member about its longitudinal axis, to mix the food being prepared; and (f) means for sealing the opening in the first end of the hollow member against positive and negative pressures, whereby the cooking pot can be operated at atmospheric, superatmospheric, and subatmospheric pressures.

13. The cooking pt of claim 12, further comprising:

(g) means for rotating the hollow member about its lateral axis, to dispense the prepared food.

* * * * *